(12) United States Patent
Chao et al.

(10) Patent No.: US 8,659,638 B2
(45) Date of Patent: Feb. 25, 2014

(54) METHOD APPLIED TO ENDPOINT OF VIDEO CONFERENCE SYSTEM AND ASSOCIATED ENDPOINT

(75) Inventors: Kuo-Chuan Chao, New Taipei (TW); Hung-Heng Hsu, New Taipei (TW); Kun-Lung Hung, New Taipei (TW)

(73) Assignee: Aver Information Inc., New Taipei (TW)

( * ) Notice: Subject to any disclaimer, the term of this patent is extended or adjusted under 35 U.S.C. 154(b) by 288 days.

(21) Appl. No.: 13/187,805

(22) Filed: Jul. 21, 2011

(65) Prior Publication Data

US 2013/0021430 A1    Jan. 24, 2013

(51) Int. Cl.
*H04N 7/15* (2006.01)

(52) U.S. Cl.
CPC ........................... *H04N 7/15* (2013.01)
USPC ................... 348/14.08; 348/14.12; 348/14.01

(58) Field of Classification Search
USPC ........... 348/14.01–14.16; 375/240.13, 240.16
See application file for complete search history.

(56) References Cited

U.S. PATENT DOCUMENTS

| 6,351,493 B1* | 2/2002 | Reed et al. ............... 375/240.13 |
| 2009/0010485 A1* | 1/2009 | Lamb et al. ................... 382/100 |
| 2012/0066596 A1* | 3/2012 | Feng et al. ..................... 715/719 |

FOREIGN PATENT DOCUMENTS

TW                527825          4/2003

OTHER PUBLICATIONS

Taiwan Patent Office, "Office Action", Aug. 23, 2013.

\* cited by examiner

*Primary Examiner* — Melur Ramakrishnaiah
(74) *Attorney, Agent, or Firm* — WPAT, PC; Justin King

(57) ABSTRACT

Method applied to endpoint of video conference system and associated endpoint; in a receiving endpoint which receives video conference packets, while obtaining pictures from contents of video and data within the video conference packets, capturing the pictures as images on a user capture command or a result of automatic scene change detection.

9 Claims, 7 Drawing Sheets

METHOD APPLIED TO ENDPOINT OF VIDEO CONFERENCE SYSTEM AND ASSOCIATED ENDPOINT

FIELD OF THE INVENTION

The present invention relates to method applied to endpoint of video conference system and associated endpoint, and more particularly, to method and associated endpoint enabling real-time image capture of pictures sent from a transmitting endpoint at a receiving endpoint during video conference.

BACKGROUND OF THE INVENTION

Video conference systems enable people of different locations to exchange opinions, information, intelligence and knowledge through video, and therefore are adopted popularly. A video conference system includes multiple endpoints, a local endpoint of a local user exchanges video conference packets with remote endpoints of other users to establish a video conference.

While holding a video conference, a local endpoint of a host user, who provides contents such as data, pictures, slides (briefs), and/or videos, transmits the contents to remote endpoint(s) of other participant(s). Therefore, the endpoint of the host user is referred to as a "transmitting endpoint" which packetizes the contents into video conference packets and transmits the video conference packets to endpoints of remote participants. And the remote participants become "terminal users"; the endpoints used by the terminal users, referred to as "receiving endpoints", receive video conference packets transmitted by the transmitting endpoint.

During the video conference, for keeping key points of video conference and managing information of video conference, the terminal users demand to capture contents provided by the host user. However, with prior art, the terminal users can not perform real-time content capture while the video conference is still in progress; they have to capture the contents with complicated post-production procedure after end of the video conference. Please refer to FIG. 1 illustrating a flow 100 for a terminal user to capture contents of the host user according to prior art. During video conference (step 102), the terminal user of the receiving endpoint needs to activate a video conference recording function (step 104) for recording proceedings of the video conference. After end of the video conference and the recording (step 106), the terminal user has to replay formerly recorded proceedings of the video conference with playback software. During playback, the terminal user needs to search desired pictures of the contents again; when the terminal user finds a picture desired to be captured, the terminal user issues a capture command to the playback software (step 110), so the picture desired to be captured can be encoded and compressed as an image by the playback software (step 112), and then the captured image can be backed up in a storage device (step 114).

In other words, according to the prior art, even the terminal user has found contents desired to be capture during the video conference, the terminal user can not capture the desired contents (pictures) instantaneously; the terminal user has to perform capture with the post-production procedure after the video conference. This is time-consuming and inconvenient for terminal users.

SUMMARY OF THE INVENTION

To address issues of prior art, the invention discloses technology for active and live content capture at receiving endpoints, so the terminal users of receiving endpoints can capture desired pictures of contents to images while video conference is in progress.

An objective of the invention is providing to a method applied to an endpoint of a video conference system, including: receiving a video conference packet; obtaining a content from the video conference packet; obtaining a picture from the content by decoding and decompressing the content; if a capture command is received, capturing the picture as an image. The picture can be of YUV (luminance-chrominance) format, and can be converted to picture of RGB format for playback. The captured image can be a still image to be stored in storage devices and/or to be shared to user(s) of other endpoint(s).

In an embodiment, the video conference packet is a packet following H.323 protocol, and includes content of video & data; wherein the content, also known as brief content, is video content following H.239 protocol. That is, the video conference packet follows format and communication protocol of H.323. H.323 is an audio-visual communication protocol recommended by ITU-T (international telecommunications union-telecommunication standardization sector), and H.239 is a protocol recommended by ITU-T for data sharing; H.239 can be applied under H.323 protocol to carry video content in packet of H.323 protocol. Also, the video conference protocol followed by the video conference packet can be Session Initiation Protocol (SIP) for transmitting packets containing content of video & data; and the content (the brief content) can be transmitted with Binary Floor Control Protocol (BFCP).

One objective of the invention is providing a method applied to an endpoint of a video conference system, including: receiving a video conference packet; obtaining a content from the video conference packet; obtaining a first picture from the content; performing a scene change detection for the first picture after receiving an automatic capture command; if scene change is detected, capturing the first picture or a second picture after the first picture as an image. In an embodiment, the scene change detection is performed by determining whether the first picture is a picture of intra-frame coding; if true, scene change is detected and the first picture of intra-frame coding is automatically captured as an image. Otherwise, if no scene change is detected, the first picture is not captured as an image.

One objective of the invention is providing an endpoint for a video conference system, including: a network interface receiving a video conference packet; a processing module obtaining a content from the video conference packet, and obtaining a picture from the content; and a capture module; wherein when the capture module receives a capture command, the capture module captures the picture as an image.

One objective of the invention is providing an endpoint for a video conference system, including: a network interface receiving a video conference packet; a processing module obtaining a content from the video conference packet, and obtaining a picture from the content; a scene change detection module performing a scene change detection for the first picture after receiving an automatic capture command; and a capture module. When the scene change detection module detects scene change, the capture module captures the first picture or a second picture after the first picture as an image.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
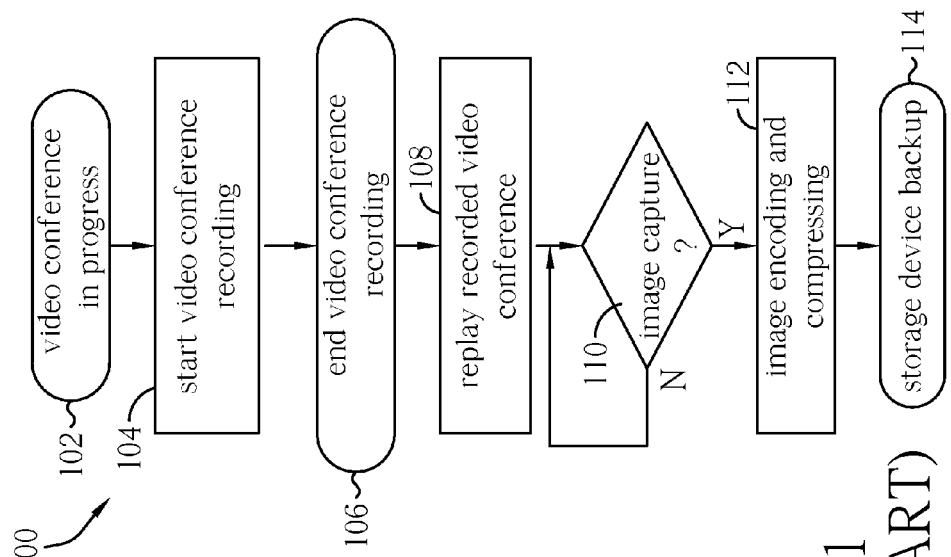
FIG. 1 (Prior Art) illustrates a flow for a terminal user to capture content of video conference according to prior art.
Figure 2:
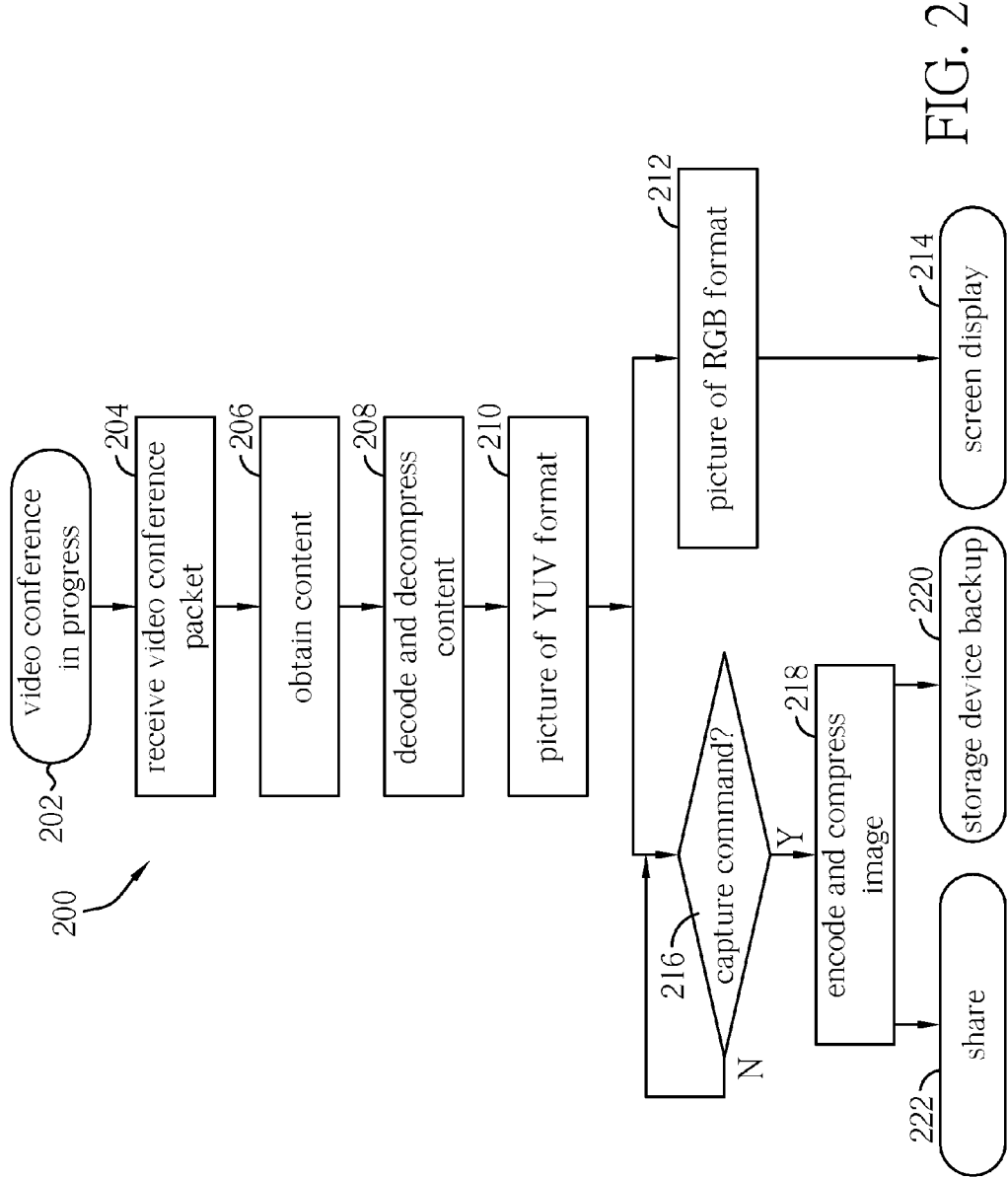
FIG. 2 illustrates a flow according to an embodiment of the invention.

Please refer to FIG. 2 illustrating a flow 200 according to an embodiment of the invention; while a video conference is established in a video conference system, the flow 200 can be applied to a receiving endpoint of a terminal user, so the terminal user can capture content pictures provided by the host user as images in real time while the video conference is in progress. Steps of the flow 200 can be described as follows.

Step 202: during video conference, the flow 200 can start at the receiving endpoint of the terminal user.

Step 204: the receiving endpoint receives a video conference packet sent by the transmitting endpoint of the host user, e.g., a video conference of H.323 protocol.

Step 206: from the video conference packet, obtain a content provided by the host user, e.g., a video content of H.239 protocol.

Step 208: obtain a picture from the content by video decoding and decompressing the content. For example, the content can include one or more pictures, each picture is a frame of a video; the transmitting endpoint can encode and compress the pictures to the content with codec following H. 263, H.263+ (H.263v2) or H.264. Accordingly, in step 208, the receiving endpoint can decode and decompress the content with corresponding codec. H.263, H.263+ and H.264 are video coding/decoding standards developed by ITU-T VCEG (Video Coding Experts Group).

Step 210: after step 208, a picture is obtained from the content; each picture contained in the content can be of YUV format. The YUV format describes each color in videos or still images with a luminance component and two chrominance components. After step 210, the flow 200 can proceed to step 212 and/or step 216.

Step 212: convert the picture of YUV format to a picture of RGB format (Red-Green-Blue color).

Step 214: display the picture(s) of RGB format of step 212 on a screen of the receiving endpoint, so the terminal user of the receiving endpoint can watch content provided by the host user.

Step 216: within the duration of step 208, the receiving endpoint repeatedly checks if the terminal user issues a capture command. If true, proceed to step 218.

Step 218: after receiving the capture command, encode and compress the picture of step 208 to an image. For example, the receiving endpoint can encode and compress the picture to still image file of JPEG or JPEG 2000 format. JPEG and JPEG 2000 are image coding/decoding standards developed by JPEG (Joint Photographic Experts Group). After image capture, proceed to step 220 and/or step 222.

Step 220: the captured image in step 218 can be backed up in a storage device, like non-volatile storage device such as a memory card, a flash memory, optic disk drive and/or hard-disk drive.

Step 222: the image captured in step 218 can also be shared to other users, such as participants of the video conference. In an embodiment, image(s) captured by the terminal user can be encoded and compressed to a content (e.g., the image(s) can be encoded and compressed to content of H.239 following H.263, H.263+ or H.264), and the content can be packetized into a video conference packet (e.g., video conference packet of H.323), and then the packetized video conference packet can be sent to other participants of the same video conference.

As the flow 200 shows, during the video conference, the terminal user can instantaneously issue a capture command while spotting a desired content picture; the desired picture(s) can then be encoded and compressed to image(s) for further backup and/or sharing.

Figure 3:
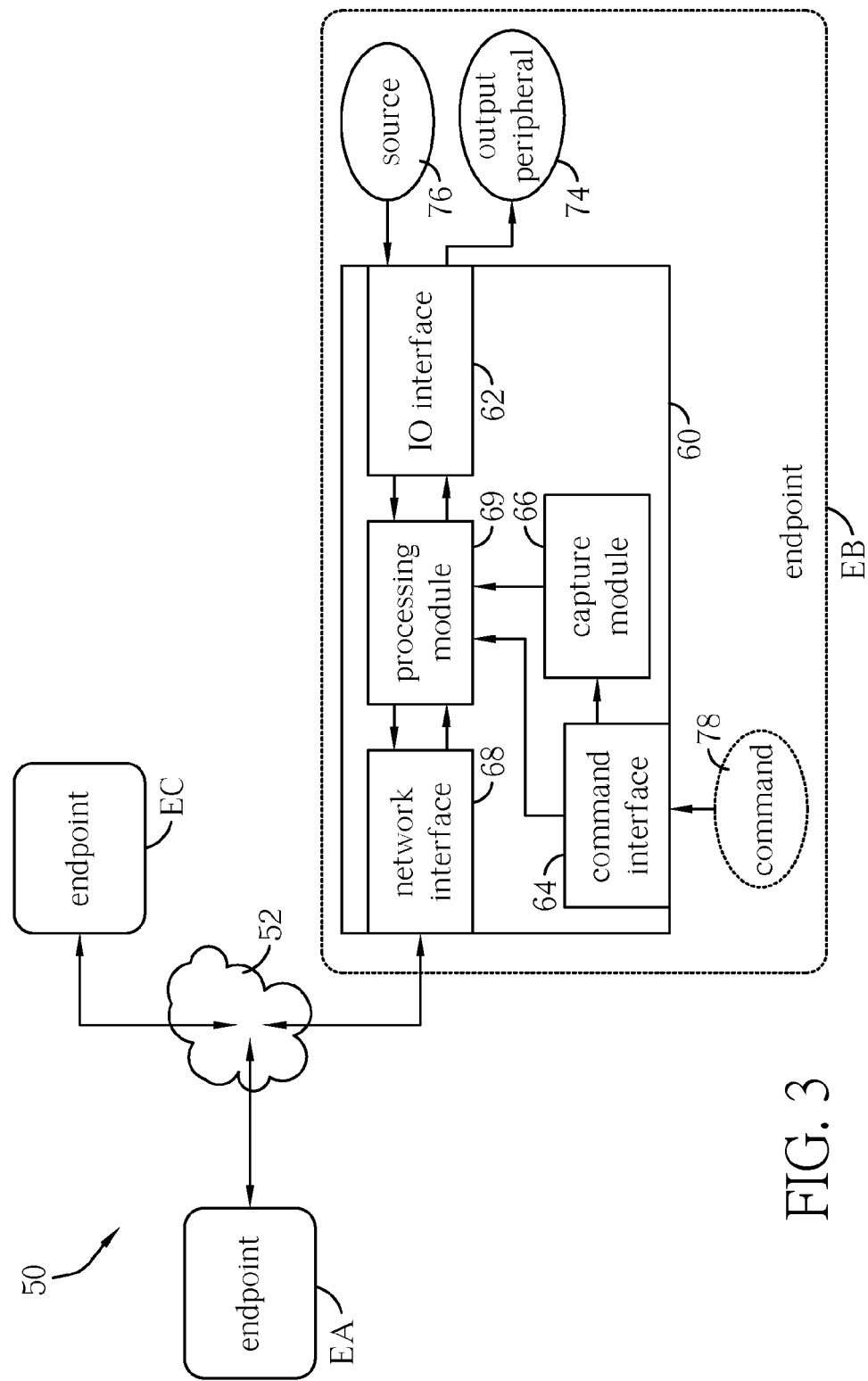
FIG. 3 illustrates an endpoint applied to a video conference system according to an embodiment of the invention.

Please refer to FIG. 3 illustrating an endpoint EB applied to a video conference system 50 according to an embodiment of the invention. The video conference system 50 includes a plurality of endpoints which are represented by the endpoints EA, EB and EC in FIG. 3; these endpoints exchange packets via a network 52 to establish a video conference, and the flow 200 of the invention can be implemented at each endpoint, e.g., the endpoint EB. The endpoint EB includes a mainframe 60, a source 76 and an output peripheral 74; the mainframe 60 includes a command interface 64, a capture nodule 66, a network interface 68, a processing module 69 and an IO interface 62.

The network 52 can be a wired network, wireless network and/or a combination of both. In the endpoint EB, the network interface 68 is coupled to the network 52, so the endpoint EB can receive and/or transmit packets, such as video conference packets. The IO interface 62 is coupled to the source 76 and the output peripheral 74. For example, to receive video signals, audio signals and/or data from the source 76, the IO interface 62 can include input port(s), and/or connector(s) for various kinds of video, audio and/or data, such as composite video connector, S-video connector, DVI (Digital Video Interface) port, HDMI (High Definition Multimedia Interface) port and/or USB (Universal Serial Bus) connector. The source 76 can include a computer (personal computer, notebook computer and/or tablet computer), a camcorder, a digital camera, a document camera and/or microphone(s).

The IO interface 62 can also include output port(s) for various kinds of audio, video and data for transmitting video signals, audio signals and/or data to the output peripheral 74. For example, the output peripheral 74 can include playback devices such as a screen, a television, a display, a projector and/or speaker(s), and/or storage devices for data backup. The IO interface 62 can also include wireless network interface utilizing radio waves for connecting to the source 76 and/or the output peripheral 74 which can support wireless communication.

The processing module 69 is coupled between the network interface 68 and the IO interface 62, and controls operation of the mainframe 60, as well as process of video conference. For example, when the network interface 68 received a video conference packet from the network 52, the processing module 69 obtains a content from the video conference packet, and then decodes and decompresses the content to obtain picture(s), audio and/or data, so the picture(s), audio and/or data can be respectively outputted as video signals, audio signals and/or data through the IO interface 62 for playback and/or backup. Correspondingly, video signals, audio signals and/or data provided by the source 76 can be received by the IO interface 62, so they can be encoded and compressed by the processing module 69 to be carried in a content, and then the content can be packetized into a video conference packet. The packetized video conference packet is sent to the network 52 through the network interface 68.

The command interface 64 is coupled to the processing module 69 and the capture module 66 for implementing a man-machine interface receiving commands 78 issued by the user, therefore the user can control the mainframe 60 through the man-machine interface. For example, the command interface 64 can include buttons, keypad, touchpad and/or touch screen, such that the user can issue various commands, like the capture command of step 216. In an embodiment, the mainframe 60 has a specific button, a hot key and/or key combination designed for the capture command, so the user can conveniently and rapidly capture received content picture(s) as image(s) during video conference.

In an embodiment, the command interface 64 can also include a remote control transmitter and a remote control receiver (not shown). The remote control transmitter has keypad, mouse, touchpad and/or touch screen accepting user control; the remote control receiver is installed in the mainframe 60. User control to the remote control transmitter is converted to corresponding command, and the command is transmitted to the remote control receiver with a remote control signal, so the mainframe 60 receives the command through the remote control receiver. In an embodiment, the remote control transmitter has a button specifically allocated for the capture command; therefore the user can issue real-time capture of content picture with single button. And/or, the command interface 64 can include camera capturing user image and/or sensor sensing user position and/or movement, so the user can issue various commands with gestures and/or movement. And/or, the command interface 64 can include microphone of voice control and corresponding voice identification mechanism; when the user say a key word, the command interface 64 issues an associated command.

The capture module 66 implements the technique of the flow 200 (e.g., step 216). When the endpoint EB works as a receiving endpoint and receives a video conference packet from another endpoint (e.g., the endpoint EA), if the capture module 66 receives the capture command through the command interface 64, the capture module 66 capture a picture obtained from the video conference packet as an image. For example, when the capture module 66 receives the capture command, it triggers the processing module 69 to encode and compress the picture to the image. The processing module 69 and/or the capture module 66 can be implemented with hardware, software, firmware and/or their combination. For example, the processing module 69 can be a processor, and the mainframe 60 can include a non-volatile or volatile memory (not shown) storing a capture code; when the processing module 69 executes the capture code, the functions of the capture module 66 are implemented, so the processing module 69 can encode and compress the user desired picture to the image on receiving the capture command.

Figure 4:
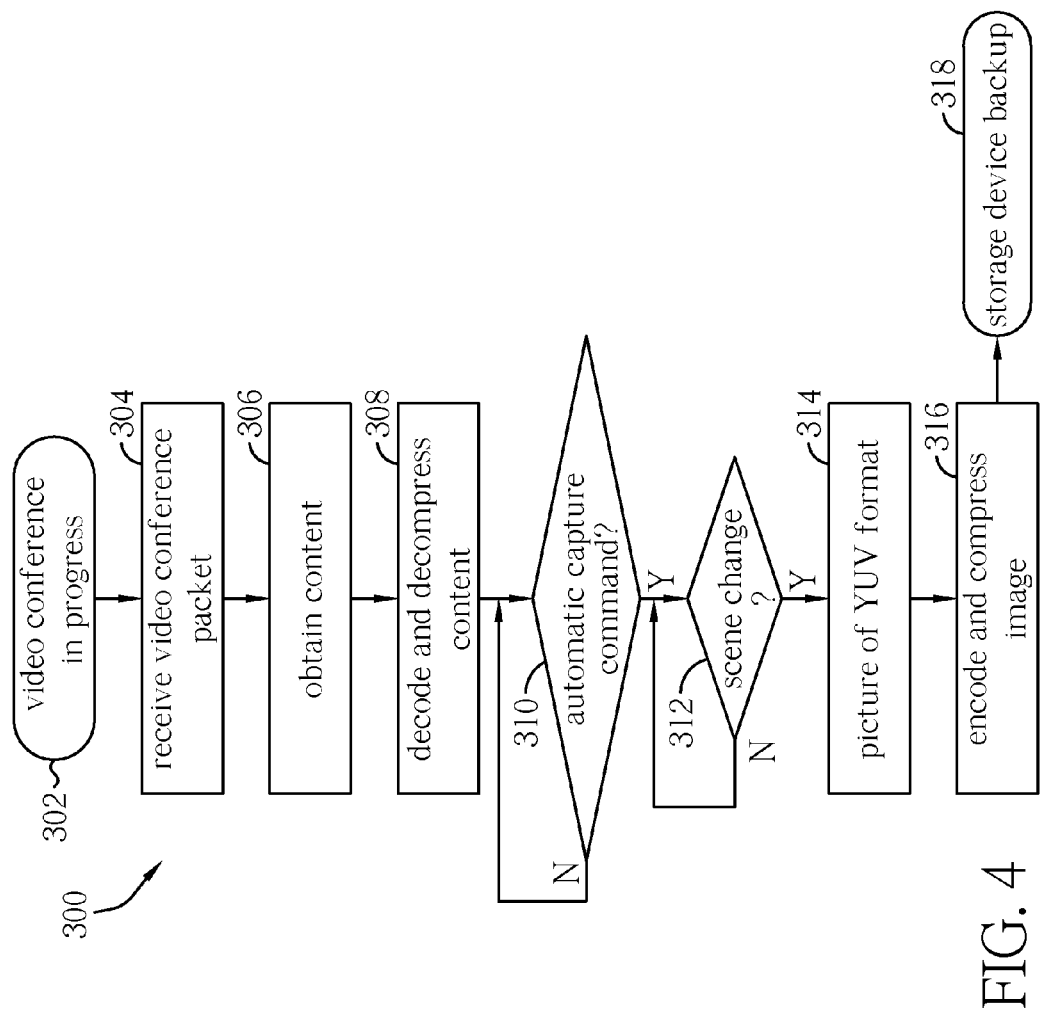
FIG. 4 to FIG. 6 illustrate flows according to other embodiments of the invention.

Please refer to FIG. 4 illustrating a flow 300 according to an embodiment of the invention; while a video conference is proceeding in a video conference system, the flow 300 can be applied to a receiving endpoint of a terminal user, so the receiving endpoint can automatically capture content pictures provided by the host user as images during the video conference. Steps of the flow 300 can be described as follows.

Step 302: during video conference, the flow 300 can start at the receiving endpoint of the terminal user.

Step 304: the receiving endpoint receives a video conference packet sent by the transmitting endpoint of the host user, e.g., a video conference packet of H.323 protocol.

Step 306: from the video conference packet, obtain a content provided by the host user, e.g., a video content of H.239 protocol.

Step 308: obtain picture(s) by video decoding and decompressing the content. For example, the content can include one or more pictures.

Step 310: within the duration when step 308 proceeds, the receiving endpoint repeatedly checks if the terminal user issues an automatic capture command. If true, proceed to step 312.

Step 312: the receiving endpoint performs scene change detection for the content picture(s) obtained in step 308. In an embodiment, the scene change detection is implemented by determining whether an obtained picture is a picture of intra-frame coding; if a picture is of intra-frame coding, it is determined to be a picture of scene change.

Step 314: after step 308, picture(s) of YUV format can be obtained from the content. When a scene change is detected in step 312, the flow 300 proceeds to step 316 after step 314.

Step 316: when a picture of scene change is detected in step 312, it is encoded and compressed to an image in this step. For example, the receiving endpoint can encode and compress the picture to still image file of JPEG or JPEG 2000 format. After image capture, proceed to step 318.

Step 318: the captured image(s) in step 316 can be backed up in a storage device, like a non-volatile storage device.

As the flow 300 demonstrates, while the video conference is in progress, when the terminal user of the receiving endpoint issues the automatic capture command, the receiving endpoint performs scene change detection and automatically capture pictures of scene change as images (step 316); on the other hand, if no scene change is detected, pictures without scene change do not have to be captured as images.

When the transmitting endpoint encodes and compresses pictures to contents, it alternately utilizes compression of intra-frame coding, inter-frame coding and/or bidirectional coding. In a video stream, if a picture $F(i)$ is just slightly different from a previous picture $F(i-1)$, then the picture $F(i)$ will be compressed with inter-frame coding; while the picture $F(i)$ is compressed with inter-frame coding, the difference between the pictures $F(i-1)$ and $F(i)$ is encoded and compressed. When the picture $F(i)$ is decoded and decompressed, it is obtained not only according to the difference between pictures $F(i-1)$ and $F(i)$, but also according to the former picture $F(i-1)$. On the contrary, if there is a great difference between a picture $F(j)$ and its previous picture $F(j-1)$, the picture $F(j)$ will be independently compressed with intra-frame coding without referring other pictures.

In other words, if a picture $F(i)$ is of inter-frame coding, the picture $F(i)$ and former pictures (e.g., the picture $F(i-1)$) are demonstrating slight different of a same scene; there is no scene change in the picture $F(i)$. On the other hand, if a picture $F(j)$ is of intra-frame coding, it demonstrates a scene different from that of former pictures (e.g., the picture $F(j-1)$); the picture $F(j)$ is therefore a picture of scene change. Accordingly, when the automatic capture command is issued, the picture $F(j)$ of scene change is automatically captured as an image, and the picture $F(i)$ without scene change is not captured as a corresponding image.

For example, the host user of the transmitting endpoint will brief a same slide for a period of time during video conference; during the period of time, since scene of video conference has a background of the same slide, video pictures of this period of time are compressed with inter-frame coding. On the other hand, if the host user switches to next slide, the scene will change, and the flow 300 can automatically capture the picture of the new slide as an image. That is, when the terminal user issues the automatic capture command to the receiving endpoint, different slides will be automatically captured as a serial of images.

There are other embodiments of scene change detection. For example, features of each picture (e.g., image edges) can be identified, and features of different pictures are compared; if feature difference exceeds a threshold, scene change is detected.

During steps 312 to 316, pictures of YUV format obtained from the content can also be converted to pictures of RGB format to be displayed, similar to steps 212 and 214 of the flow 200. Automatically captured image(s) in step 316 can also be shared, similar to step 222. During the flow 300, the terminal user can end automatic capture after issuing the automatic capture command; after the automatic capture ends, the receiving endpoint stops scene change detection, also stops capturing any picture as image.

Figure 5:
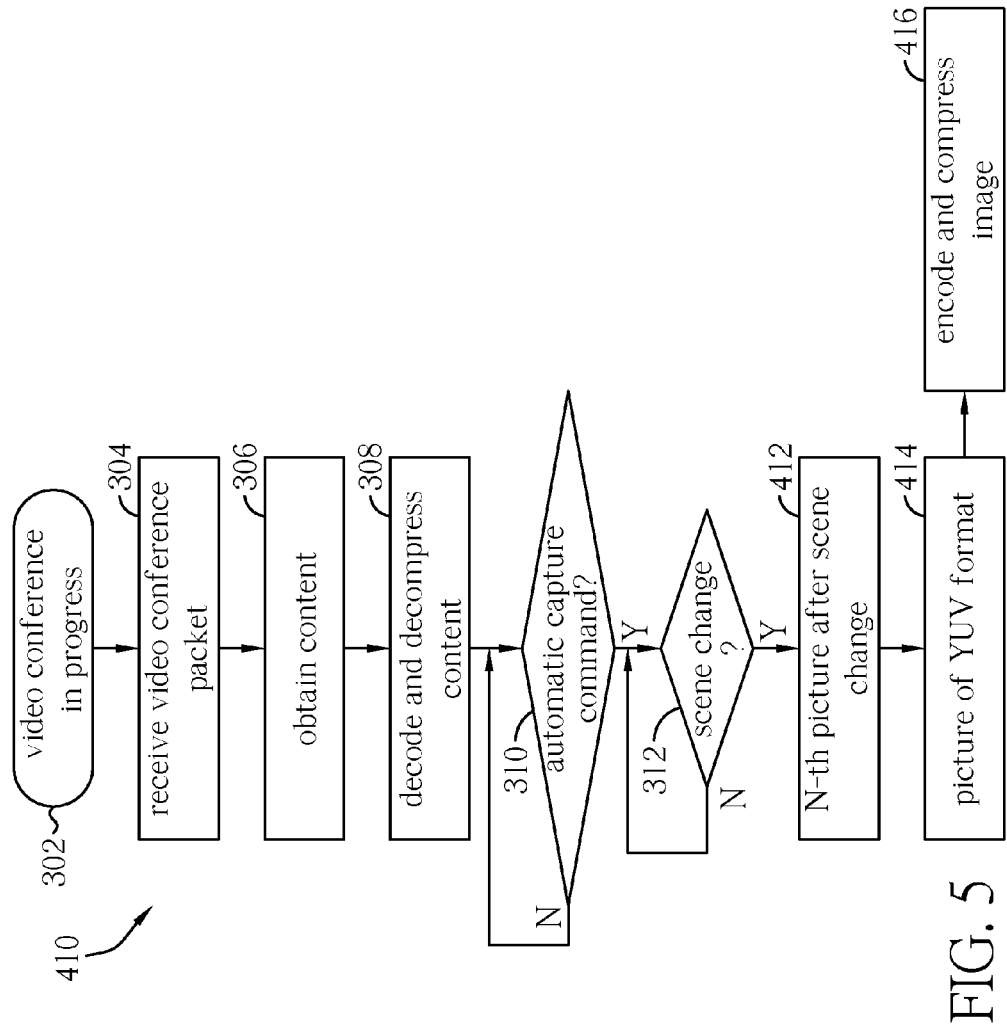

Please refer to FIG. 5 illustrating a flow 410 according to an embodiment of the invention; during a video conference of a video conference system, the flow 410 applies to a receiving endpoint of a terminal user, so the receiving endpoint can automatically capture pictures provided by the host user as images during the video conference. The flow 410 follows steps 302 to 312 of the flow 300; after step 312, following steps continue.

Step 412, after a picture of scene change is detected, an N-th picture after the picture of scene change is selected to be captured, where N is a predetermined number; for example, the N-th picture of inter-frame coding after the picture of scene change is to be captured. As an example, if a picture F(i) is a picture of scene change, the picture F(i+N) is to be captured.

Step 414: obtain the N-th picture after scene change in YUV format, i.e., obtain picture F(i+N) of YUV format.

Step 416: compress the N-th YUV format picture after scene change of to an image; that is, capture the picture F(i+N) of YUV format as an image.

When a network suffers a lower useable bandwidth, pictures of intra-frame coding which reflect scene change suffer degraded quality. Therefore, the picture with a predetermined number (i.e., N, such as 30) of pictures after scene change is selected to be automatically captured for improved quality of image capture.

Figure 6:
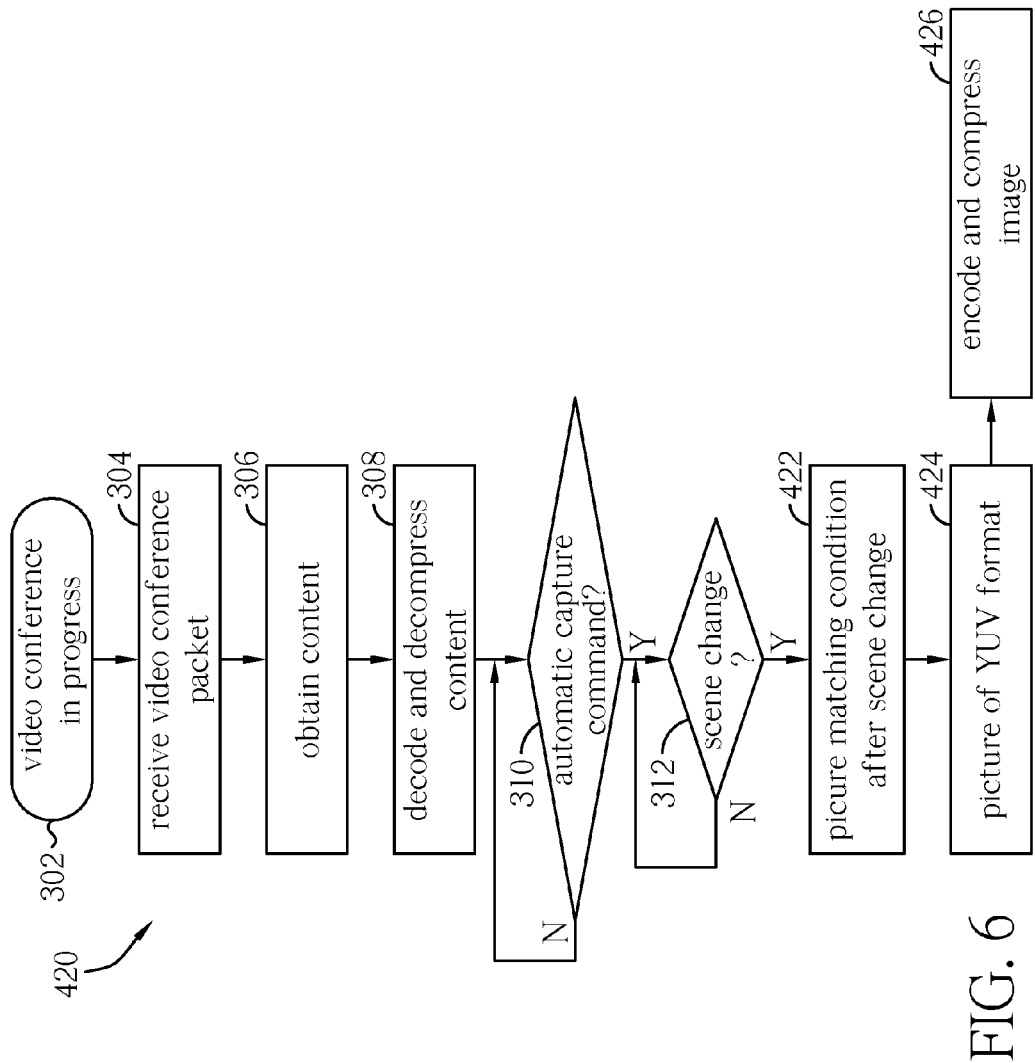

Please refer to FIG. 6 illustrating a flow 420 according to another embodiment of the invention; during a video conference of a video conference system, the flow 420 applies to a receiving endpoint of a terminal user, so the receiving endpoint can automatically capture pictures provided by the host user as images during the video conference. The flow 420 follows steps 302 to 312 of the flow 300; after step 312, following steps continue.

Step 422: after a picture of scene change is detected, find a picture matching a predetermined condition to be captured. In an embodiment, a picture with a file size matching a predetermined value after the picture of scene change is selected to be captured as an image; the predetermined value can be determined according to network bandwidth, for example, it can be a predetermined ratio of network bandwidth. As an example, if the network bandwidth is 256 MB and the predetermined ratio is 1/30, the predetermined value can be set to 9 MB (i.e., 256*1/30). For an exemplary embodiment, assuming a picture F(i) is a picture of intra-frame coding with scene change, its following pictures F(i+1), F(i+2) etc are sequentially checked if their file sizes match (equal or exceed) the predetermined value; if file size of a picture F(i+N) matches the predetermined value, the picture F(i+N) is selected to be captured.

Step 424: in YUV format, obtain the picture matching the predetermined condition after scene change, i.e., obtain the picture F(i+N) of YUV format.

Step 426: compress the YUV format picture matching the predetermined condition after scene change to an image; that is, capture the picture F(i+N) of YUV format as an image.

Because file size of a picture relates to its quality, the flow 420 also ensures quality of image capture.

In an embodiment, the flows 200 and 300/410/420 can be executed simultaneously, so the terminal user of the receiving endpoint can decide which picture(s) to be captured (the flow 200), also the receiving endpoint can automatically capture pictures of scene change (the flows 300/410/420).

Figure 7:
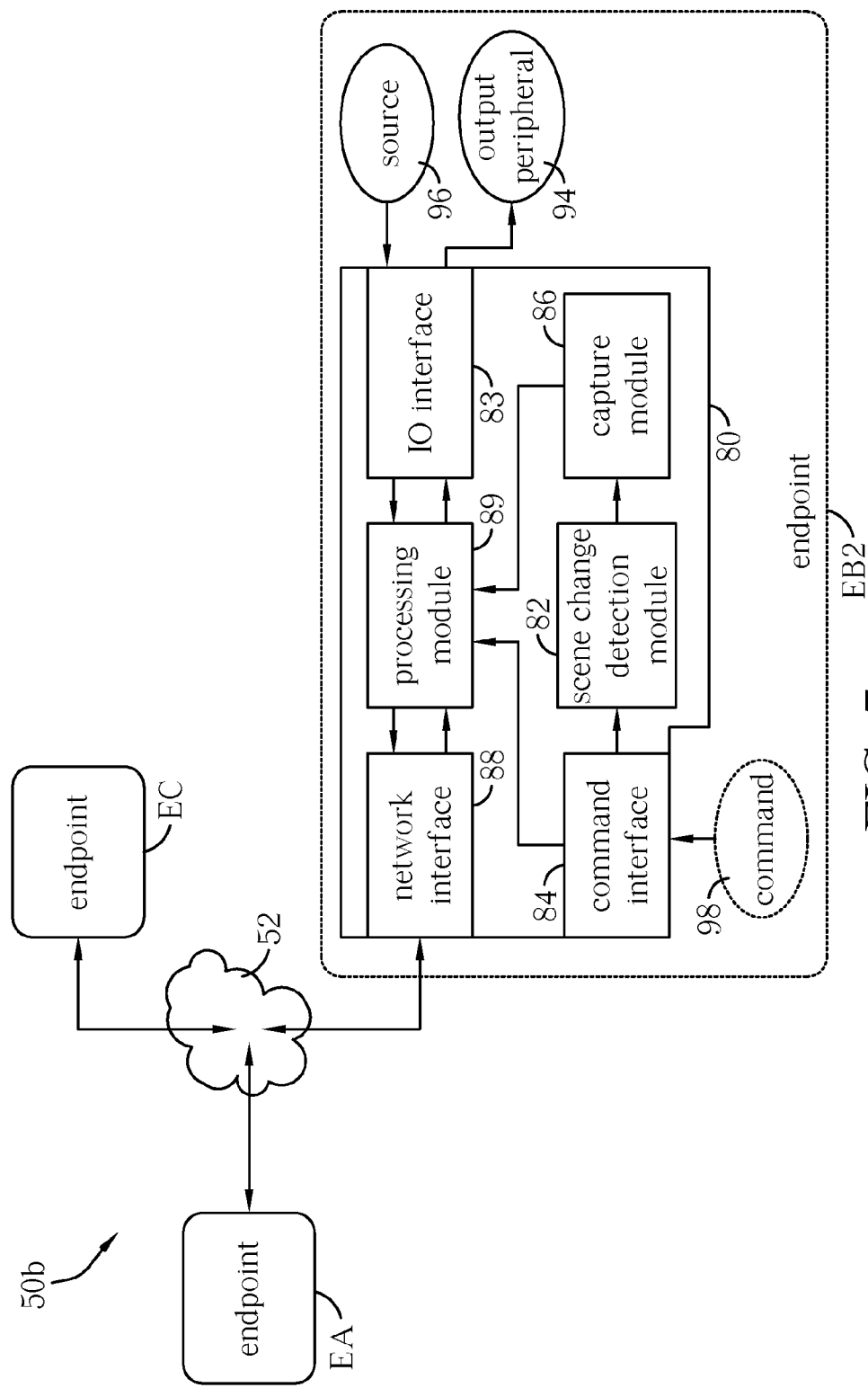
FIG. 7 illustrates an endpoint applied to a video conference system according to an embodiment of the invention.

Please refer to FIG. 7 illustrating an endpoint EB2 applied to a video conference system 50b according to an embodiment of the invention. The video conference system 50b includes a plurality of endpoints which are represented by the endpoints EA, EB2 and EC in FIG. 7; these endpoints exchange packets via a network 52 to establish a video conference, and the flow 300 of the invention can be implemented at each endpoint, e.g., the endpoint EB2. The endpoint EB2 includes a mainframe 80, a source 96 and an output peripheral 94; the mainframe 80 includes a command interface 84, a capture module 86, a scene change detection module 82, a network interface 88, a processing module 89 and an IO interface 83. Functions and embodiments of the network interface 88, the processing module 89, the IO interface 83, the source 96 and the output peripheral 94 are respectively analogous to those of the network interface 68, the processing module 69, the IO interface 62, the source 76 and the output peripheral 74 of FIG. 3.

The command interface 84 receives command 98 issued by the user, such as the automatic capture command of step 310; embodiments of the command interface 84 can be referred to the command interface 64 of FIG. 3. For example, the command interface 84 can include a specific button particularly allocated for the automatic capture command, so the user of the endpoint EB2 can issue the automatic capture command with single button.

The scene change detection module 82 and the capture module 86 implement the flows 300/410/420 (e.g., steps 312/412/422 and 316). When the endpoint EB2 works as a receiving endpoint and receives video conference packets from another endpoint (such as the endpoint EA), the processing module 89 obtains pictures in contents of the video conference packets; if the user issues the automatic capture command, the scene change detection module 82 starts scene change detection for each picture. When the scene change detection module 82 detects a picture of scene change (flow 300), a picture with a predetermined number of pictures after scene change and/or a picture matching a predetermined condition after scene change, the capture module 86 enables the picture to be captured as an image; for example, the capture module 86 can instruct the processing module 89 to encode and compress the picture to an image. The processing module 89, the capture module 86 and/or the scene change detection module 82 can be implemented by hardware, software, firmware or combination of them. For example, the processing module 89 can be a processor, and the mainframe 80 can further include a non-volatile or volatile memory (not shown) storing a scene change detection code and a capture code; when the processing module 89 executes the scene change detection code and the capture code, the functions of the scene change detection module 82 and the capture module 86 are respectively implemented, so the processing module 89 can start scene detection after receiving the automatic capture command, and automatically capture pictures of scene change as a serial of images.

To sum up, in the prior art, the terminal user of video conference can not actively capture content pictures during video conference. On the contrary, the techniques of the invention allow the terminal user to capture pictures as images during video conference; therefore complicated and time-consuming post-production can be avoided, and key points of video conference can be handled and managed more conveniently.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method applied to an endpoint of a video conference system, comprising:
   receiving a video conference packet;
   obtaining a content from the video conference packet;
   obtaining pictures from the content;
   performing a scene change detection on the pictures according to whether each of the pictures has been encoded as an intra-frame by another participate of the video conference system; and
   if scene change is detected at a first picture, capturing the first picture or a second picture after the first picture as an image.

2. The method as claimed in claim 1 further comprising:
   if no scene change is detected, not capturing the first picture as an image.

3. The method as claimed in claim 1 further comprising:
   starting the scene change detection after receiving an automatic capture command.

4. The method as claimed in claim 3, wherein the second picture is an N-th picture after the first picture with N a predetermined number.

5. The method as claimed in claim 3, wherein a file size of the second picture matches a predetermined value.

6. An endpoint for a video conference system, comprising:
   a network interface receiving a video conference packet;
   a processing module obtaining a content from the video conference packet, and obtaining pictures from the content;
   a scene change detection module performing a scene change detection on the pictures according to whether each of the pictures has been encoded as an intra-frame by another participate of the video conference system; and
   a capture module; wherein when the scene change detection module detects scene change at a first picture, the capture module captures the first picture or a second picture after the first picture as an image.

7. The endpoint as claimed in claim 6, wherein the scene change detection module starts scene change detection after receiving an automatic capture command.

8. The endpoint as claimed in claim 6, wherein the second picture is an N-th picture after the first picture with N a predetermined number.

9. The endpoint as claimed in claim 6, wherein a file size of the second picture matches a predetermined value.

* * * * *